Jan. 5, 1971   S. A. GUERRIERI   3,552,948
REDUCTION OF METAL SULFIDES
Filed June 9, 1967
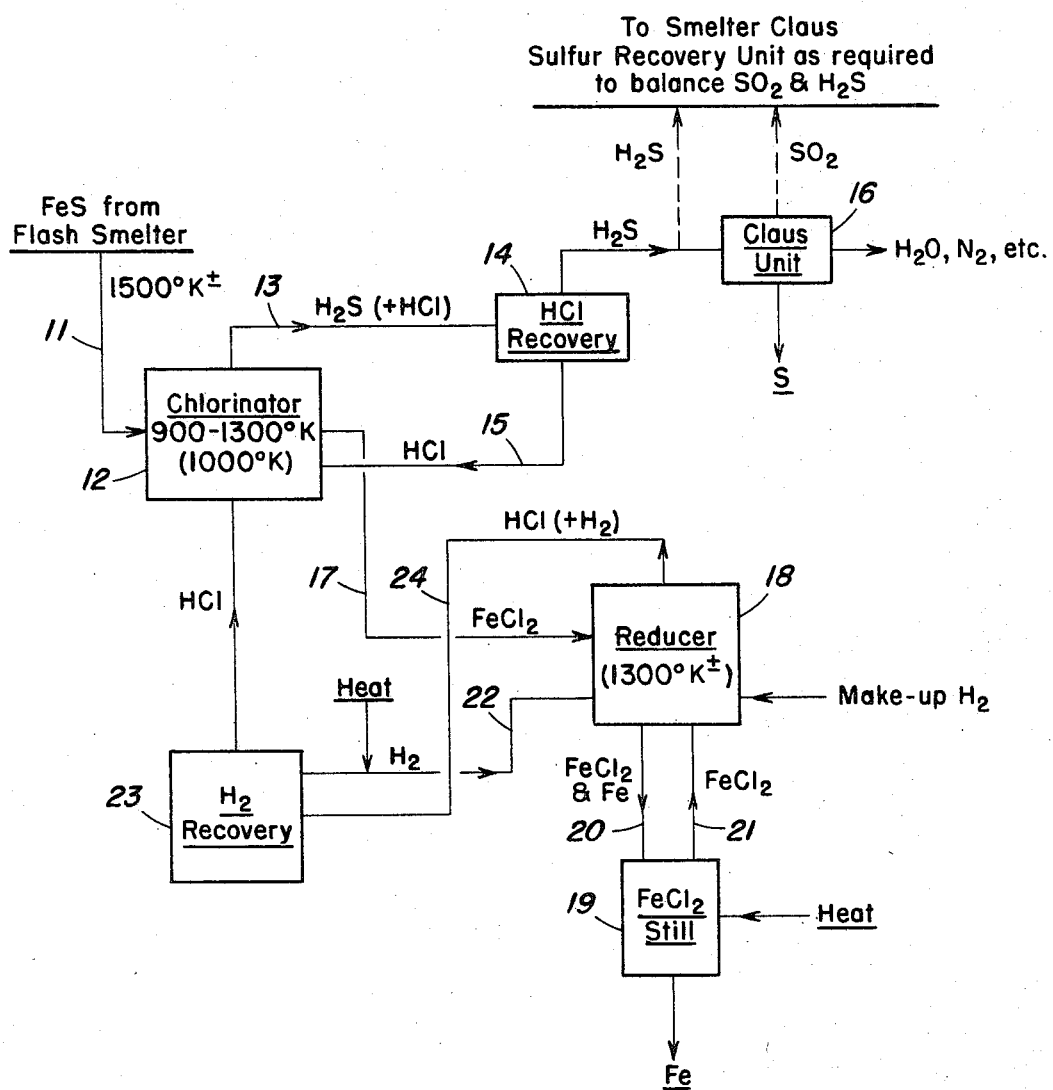
INVENTOR.
Salvatore A. Guerrieri
BY
ATTORNEY

United States Patent Office 3,552,948
Patented Jan. 5, 1971

3,552,948
REDUCTION OF METAL SULFIDES
Salvatore A. Guerrieri, Rowayton, Conn., assignor to The Lummus Company, New York, N.Y., a corporation of Delaware
Filed June 9, 1967, Ser. No. 644,908
Int. Cl. C22b 5/18; C01b 17/06
U.S. Cl. 75—34
4 Claims

ABSTRACT OF THE DISCLOSURE

Process for refining a metal sulfide, illustratively ferrous sulfide, wherein the sulfide in molten form is contacted with hydrogen chloride gas in a chlorinator whereby the metal sulfide is converted to the corresponding metal chloride, the metal chloride then being passed to a reducer where it is reduced to iron by contact with hydrogen gas. The iron thus produced is withdrawn as a slurry in molten ferrous chloride and thereafter separated by vaporizing the ferrous chloride. The hydrogen sulfide produced by the reaction of metal sulfide and hydrogen chloride is passed to a Claus unit for the production of elemental sulfur.

---

This invention relates to a process for reducing metal sulfides, especially as they occur in metal refining. Treatment of molten ferrous sulfide produced by flash smelting of pyrites will here be discussed in detail. However, it should be understood that this teaching also applies to the refining of pyrrhotite, marcasite, chalcopyrite, chalcocite, bornite and pentlandite. Initial smelting to produce a metal sulfide can also be accomplished by a variety of known techniques under either oxidizing or reducing conditions.

In the recovery of sulfur and iron from pyrites as practiced by Outokumpu of Finland, after suitable preparation, finely divided ore is flash smelted under reducing conditions whereby ferrous sulfide, elemental sulfur and gaseous sulfur compounds (including hydrogen sulfide, sulfur dioxide and carbonyl sulfide) are formed. The ferrous sulfide is cooled, granulated and then roasted to form granules of relatively pure ferric oxide as well as to liberate sulfur dioxide. The gases from the smelter are cooled and passed through a well known Claus type convertor to produce elemental sulfur. The overall products of the process are a high grade iron ore, elemental sulfur and a gas stream comprising sulfur dioxide, nitrogen and unconsumed oxygen.

Sulfur dioxide from the roaster, which represents half of the sulfur in the ore originally fed to the smelter, may be converted to sulfuric acid if economics or other factors justify such conversion. When sulfuric acid production at the site is not employed, sulfur dioxide disposal becomes a problem with incident waste and pollution of the atmosphere.

Applicant accomplishes metal and elemental sulfur recovery, from molten ferrous sulfide discharged by flash smelters, in a novel and facile way. The elemental sulfur is readily transportable. Also air pollution is avoided. Briefly, as applied to pyrites the invention comprises, first, treating the hot molten ferrous sulfide with hydrogen chloride to liberate hydrogen sulfide and to convert the ferrous sulfide into its chloride, and second, contacting the chloride with hydrogen to reduce the chloride to substantially pure iron and to regenerate hydrogen chloride for reuse in the first step. The hydrogen sulfide produced in the first step is put through a Claus type convertor to yield elemental sulfur. Thus the overall result of the process here presented is the production of elemental iron and elemental sulfur from ferrous sulfide.

For a more detailed description of this invention please refer to the accompanying drawing which shows a simplified flow chart of the process. Molten ferrous sulfide from a flash smelter is introduced via line 11 into chlorinator 12 where it is contacted with hydrogen chloride gas, and where the sulfide is converted into the chloride per the reaction:

$$FeS + 2HCl = FeCl_2 + H_2S \qquad (1)$$

Gas released in chlorinator 12 is substantially hydrogen sulfide, but it may contain some unreacted hydrogen chloride. The amount of hydrogen chloride in the gas depends upon the temperature in chlorinator 12 as well as upon contact efficiency. If the amount of hydrogen chloride in line 13 is appreciable, it may be separated from the hydrogen sulfide by a separator shown at 14 and returned to chlorinator 12 via line 15 while substantially pure hydrogen sulfide is sent to Claus unit 16 for sulfur production. Because the hydrogen sulfide gas from chlorinator 12 contains a minimum amount of diluents, a separate Claus unit is used from the Claus unit employed for elemental sulfur production on gases from the flash smelter. Either hydrogen sulfide or sulfur dioxide may be exchanged with the Claus unit associated with the flash smelter to adjust the ratio of sulfur dioxide to hydrogen sulfide in both Claus units. Claus units per se are well known as evidenced by an article in the June 1966 issue of Hydrocarbon Processing—Petroleum Refinery, volume 45, No. 6, from pages 181 through 185, by P. C. Opekar and B. G. Goar.

Heat must be removed from the chlorination step because reaction (1) is exothermic and because the feed from the flash smelter is at a temperature higher than the operating temperature of chlorinator 12. Some of this excess heat may be absorbed by the introduction of cold hydrogen chloride gas into the chlorinator. Any remaining excess heat could be removed by recycling cooled chlorinator off gas.

Ferrous chloride produced in chlorinator 12 flows via line 17 to reducer 18. In reducer 18, ferrous chloride is reduced to iron by contact with hydrogen gas according to the reaction:

$$FeCl_2 + H_2 = Fe + 2HCl \qquad (2)$$

The iron so produced is withdrawn from reducer 18 into still 19 via line 20 as a slurry in molten ferrous chloride and is separated from the latter in still 19 by vaporizing ferrous chloride. Ferrous chloride vapor is returned via line 21 to reducer 18.

Hydrogen is introduced to reducer 18 by way of line 22. Hydrogen chloride along with some unreacted hydrogen is delivered from reducer 18 to hydrogen recovery unit 23 via line 24. The separation of hydrogen from hydrogen chloride before returning the hydrogen chloride via line 25 to chlorinator 12 can be accomplished by a number of well known techniques such as the use of molecular sieves or by absorption of hydrogen chloride in strong hydrochloric acid solutions or other solvents followed by stripping.

Because the ferrous sulfide fed to this process via line 11 has already been through a considerable purifying process in a flash smelter and because of the chlorinating step here involved, the iron produced is quite pure. This iron comes from the process in a powder form. Most metals, other than iron, which may be present in the pyrites ore matte will form volatile chlorides and will be discharged with the off gas from chlorinator 12. These chlorides are condensed out of the gas (by means not shown) for further refining when the gas is cooled.

The temperature of chlorinator 12 is shown on the flow diagram to be between 900 and 1300 degrees Kelvin. The lower temperature must be somewhat above the melting point of ferrous chloride whereas the upper temperature is one where ferrous chloride has an appreciable vapor pressure. Variation of free energy change with temperature for reaction (1) is given in the following table:

Temperature—Degrees Kelvin: 700, 900, 1100, 1500
Free energy change—Kcal. per gm. mol. of FeS: −12.3, −2.7, +2.9, +10.0

It is evident that lower temperatures favor the conversion of the sulfide to the chloride. For the purpose of illustration, a temperature of 1,000° K. is used where the free energy change for the reaction is approximately zero. A somewhat lower temperature may be better because the free energy change is more favorable and because the vapor pressure of ferrous chloride is lower. A further advantage of lower temperature is less hydrogen chloride in the chlorinator of gas to line 13 resulting in lower hydrogen chloride losses or in lower hydrogen chloride recovery and recycle costs. The disadvantage in the lower temperatures is the need to remove heat in chlorinator 12 because the ferrous sulfide feed must be cooled to a lower temperature, and the subsequent requirement of more heat in reducer 18 because ferrous chloride feed to reducer 18 via line 17 must be raised through a greater temperature range. Therefore, the precise temperature to use in chlorinator 12 must depend upon a case by case study.

Chlorinator 12 may be a single vessel with a baffle separating a gas-liquid contact zone from a settling zone in communication therewith. The liquid is molten ferrous chloride containing suspended solid ferrous sulfide particles. This suspension is continuously maintained in the contact zone by the action of gas bubbling through the liquid. In the settling zone, ferrous sulfide settles out of the liquid and returns to the contact zone, while ferrous chloride overflows for delivery via line 17 to reducer 18. More than one contact stage may be used if needed.

The construction and operation of reducer 18 is similar to that of chlorinator 12 except for two important distinctions. In reducer 18 heat must be supplied to attain reaction temperature as well as to supply the endothermic heat of reaction. Furthermore, the separation of one of the products, iron, poses a difficult problem because it must be separated hot and clean from liquid ferrous chloride.

Variation of free energy change with temperature for reaction (2) is given in the following table:

Temperature—Degrees Kelvin: 1000, 1300, 1500
Free energy change—Kcal. per gm. mol. of FeCl$_2$: +5.6, +0.6, +1.12

The most favorable temperature for reaction (2) is about 1,300° K., where free energy change approaches zero. Above and below this temperature, free energy change is a larger positive number, and therefore, less favorable. Also at 1,300° K., the equilibrium gas from the reducer is about 38% hydrogen and 62% hydrogen chloride. It is probably not economic to let so much hydrogen go with the hydrogen chloride into the chlorinator, so hydrogen recovery as shown at 23 is desirable.

Separation of iron from ferrous chloride could be achieved by hot filtration, or by centrifuging, but it can be more conveniently accomplished in this process by simply withdrawing a slurry of iron in ferrous chloride via line 20 and vaporizing ferrous chloride out of the mixture in still 19. Ferrous chloride vapor is returned to the reducer 18 via line 21 where, on condensation, it supplies some of the heat required therein.

Heat for the process may be supplied by the combustion of fuels, or in part by the combustion of hydrogen sulfide to form sulfur dioxide which is required in the Claus unit. The most convenient heat supply would be electricity using either induction or resistance heating and employing either the vessel liner or the ferrous chloride-iron slurry as an electrical conductor.

A plant, processing approximately 90 short tons of ferrous sulfide, requires removal of about 76,000,000 B.t.u./hr. from chlorinator 12 and the addition of about 47,000,000 B.t.u./hr. to reducer 18.

It will be apparent to those skilled in refining sulfides ores that wide deviations can be made from the process here disclosed without departing from the main theme of invention set forth in the claims.

What is claimed is:
1. A process for refining a metal sulfide and comprising the steps of
  treating molten metal sulfide with hydrogen chloride at a temperature of from 900 to 1300 degrees Kelvin to liberate hydrogen sulfide and to convert the metal sulfide to metal chloride,
  contacting the metal chloride with hydrogen at a temperature of from 1200 to 1400 degrees Kelvin to convert the metal chloride to the metal and to regenerate hydrogen chloride,
  introducing the hydrogen sulfide to a Claus type convertor to produce elemental sulfur therefrom.
2. In a process for treating an ore selected from the group consisting of pyrites, pyrrhotite, marcasite, chalcopyrite, bornite and pentlandite which process includes smelting the ore to produce a molten metal sulfide, the improvement which comprises the steps of
  treating the molten metal sulfide with hydrogen chloride at a temperature of from 900 to 1300 degrees Kelvin, to liberate hydrogen sulfide and to convert the metal sulfide to metal chloride,
  contacting the metal chloride with hydrogen at a temperature of from 1200 to 1400 degrees Kelvin to convert the metal chloride to the metal and to regenerate hydrogen chloride,
  introducing the hydrogen sulfide to a Claus type convertor to produce elemental sulfur therefrom.
3. In a process for treating pyrites ore which process includes flash smelting the ore under reducing conditions to produce molten ferrous sulfide as well as elemental sulfur and gaseous sulfur compounds, the improvement which comprises the steps of
  treating the molten ferrous sulfide with hydrogen chloride at a temperature of from 900 to 1300 degrees Kelvin to liberate hydrogen sulfide and to convert the ferrous sulfide to ferrous chloride,
  contacting the ferrous chloride with hydrogen at a temperature of from 1200 to 1400 degrees Kelvin to convert the ferrous chloride to iron and to regenerate hydrogen chloride,
  introducing the hydrogen sulfide to a Claus type convertor to produce elemental sulfur therefrom.
4. In a process for treating pyrites ore which process includes flash smelting the ore under reducing conditions in a smelting zone to produce molten ferrous sulfide as well as elemental sulfur and gaseous sulfur compounds, the improvements which comprises the steps of
  defining a chlorinating zone,
  delivering the ferrous sulfide from the molten smelting zone to the chlorinating zone,
  treating the hot ferrous sulfide with hydrogen chloride at a temperature of from 900 to 1300 degrees Kelvin in the chlorinating zone to liberate hydrogen sulfide and to convert the ferrous sulfide into ferrous chloride,
  defining a reducing zone,
  delivering the ferrous sulfide from the chlorinating zone to the reducing zone,
  contacting the ferrous chloride with hydrogen at a temperature of from 1200 to 1400 degrees Kelvin in the reducing zone to convert the ferrous chloride to iron and to regenerate hydrogen chloride for use in the chlorinating zone,
  introducing the hydrogen sulfide from the chlorinating zone to a Claus type convertor to produce elemental sulfur therefrom.

(References on following page)

References Cited

UNITED STATES PATENTS

| | | | |
|---|---|---|---|
| 1,870,477 | 8/1932 | Bacon | 23—181X |
| 1,980,809 | 11/1934 | Levy | 75—113X |
| 2,723,912 | 11/1955 | Reeve | 75—113 |
| 2,762,700 | 9/1956 | Brooks | 75—34X |
| 3,416,914 | 12/1968 | Guerrieri | 75—34 |

FOREIGN PATENTS

| | | | |
|---|---|---|---|
| 76,300 | 2/1950 | Norway | 75—28 |

WINSTON A. DOUGLAS, Primary Examiner

C. F. Le FEVOUR, Assistant Examiner

U.S. Cl. X.R.

23—225; 75—90